United States Patent
Xu et al.

(10) Patent No.: US 12,403,772 B2
(45) Date of Patent: Sep. 2, 2025

(54) MULTIPLE RIDER DETECTION SYSTEM

(71) Applicant: Neutron Holdings, Inc., San Francisco, CA (US)

(72) Inventors: Yusheng Xu, Kunshan (CN); Junjie Zhao, Kunshan (CN); Yongjin Zhang, Kunshan (CN); Dounan Tang, Sunnyvale, CA (US); Nan Cao, Troy, MI (US); Jeh Lokhande, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 144 days.

(21) Appl. No.: 18/107,769

(22) Filed: Feb. 9, 2023

(65) Prior Publication Data

US 2024/0270077 A1 Aug. 15, 2024

(51) Int. Cl.
*B60L 3/06* (2006.01)
*B60Q 9/00* (2006.01)
*G01G 19/12* (2006.01)
*G01G 19/44* (2006.01)

(52) U.S. Cl.
CPC .............. *B60L 3/06* (2013.01); *B60Q 9/00* (2013.01); *G01G 19/12* (2013.01); *G01G 19/44* (2013.01)

(58) Field of Classification Search
CPC . B60L 3/06; B60Q 9/00; G01G 19/12; G01G 19/44; G01G 19/4142; B62J 27/00; B62J 45/41; B62J 50/21; B62K 3/002; B62H 5/08; G05D 1/00; B60W 2300/365
See application file for complete search history.

(56) References Cited

U.S. PATENT DOCUMENTS

| | | | | |
|---|---|---|---|---|
| 11,386,168 B2* | 7/2022 | Ricci | ...................... | B60K 35/00 |
| 11,772,662 B1* | 10/2023 | Sohmer | .................. | B62J 45/411 |
| | | | | 701/428 |
| 12,090,942 B2* | 9/2024 | Kim | ........................ | G06Q 10/02 |
| 2010/0131164 A1* | 5/2010 | Carter | ..................... | B60L 50/52 |
| | | | | 701/61 |
| 2010/0236849 A1* | 9/2010 | Wishart | ............... | B60K 7/0007 |
| | | | | 310/115 |

(Continued)

FOREIGN PATENT DOCUMENTS

| CN | 211281362 U | 8/2020 |
|---|---|---|
| JP | 2010030569 A | 2/2010 |

(Continued)

OTHER PUBLICATIONS

KR-20200109009-A machine translation (Year: 2020).*

(Continued)

*Primary Examiner* — Angelina M Shudy
(74) *Attorney, Agent, or Firm* — Dentons US LLP

(57) ABSTRACT

The present application describes systems and methods for detecting more than a predetermined number of riders on a vehicle. Embodiments may either infer or directly measure the mass of the user and the vehicle using one or more sensors on the vehicle to calculate the mass using a microprocessor coupled to the one or more sensors. The system and methods may take various steps to encourage riders to dismount the vehicle if the total number of riders, determined by weight, exceeds the allowed number.

21 Claims, 5 Drawing Sheets

Tandem Riding

1. In-app warning
2. Audible alert
3. Prevent throttling

Rider 1 starts trip on Lime App

Rider 2 'hops on' and Lime detects sudden change in mass

Multiple interventions that can be combined to show city how Lime deters tandem riding One rider per vehicle. Second rider finds a different vehicle.

(56) References Cited

U.S. PATENT DOCUMENTS

| | | | |
|---|---|---|---|
| 2013/0138288 A1* | 5/2013 | Nickolaou | B60W 40/13 |
| | | | 701/99 |
| 2014/0277867 A1* | 9/2014 | Nedorezov | B60W 10/08 |
| | | | 903/930 |
| 2017/0168500 A1* | 6/2017 | Bradley | G01C 21/3822 |
| 2017/0364926 A1* | 12/2017 | Crawford | G01G 23/3735 |
| 2018/0194357 A1* | 7/2018 | Hall | G07C 5/0808 |
| 2019/0099124 A1* | 4/2019 | Mattis | A61B 5/0205 |
| 2019/0324446 A1* | 10/2019 | VanderZanden | G05D 1/0291 |
| 2019/0378055 A1* | 12/2019 | Whitt | B60W 10/20 |
| 2020/0058065 A1* | 2/2020 | VanderZanden | G08G 1/202 |
| 2020/0223446 A1* | 7/2020 | Lin | B60L 3/06 |
| 2020/0238929 A1* | 7/2020 | Wippler | B60W 50/14 |
| 2021/0035032 A1* | 2/2021 | Foley | G06Q 10/02 |
| 2021/0053643 A1* | 2/2021 | Murphy | B62K 23/04 |
| 2021/0178914 A1* | 6/2021 | French | B62J 43/23 |
| 2021/0371030 A1* | 12/2021 | Begleiter | B62J 27/00 |
| 2022/0018672 A1* | 1/2022 | Woll | G01C 21/3469 |
| 2022/0055563 A1* | 2/2022 | Kim | G06Q 50/40 |
| 2023/0166713 A1* | 6/2023 | Obayashi | B60K 6/485 |
| | | | 701/22 |
| 2023/0192224 A1* | 6/2023 | Bai | B62K 21/00 |
| | | | 180/6.5 |
| 2024/0262356 A1* | 8/2024 | Hawley | B60W 50/14 |

FOREIGN PATENT DOCUMENTS

| | | | | |
|---|---|---|---|---|
| KR | 20200109009 A | * | 9/2020 | B62K 11/00 |
| KR | 102390845 B1 | | 4/2022 | |
| KR | 20220135964 A | * | 10/2022 | B62K 3/002 |
| WO | WO-2023152009 A1 | * | 8/2023 | B62H 5/18 |

OTHER PUBLICATIONS

KR-20220135964-A machine translation (Year: 2022).*
Extended European Search Report for EP Appl. No. 24156430.1, issued Jul. 15, 2024, 8 pages.

* cited by examiner

MULTIPLE RIDER DETECTION SYSTEM

BACKGROUND

Ride share light electric vehicles (e.g., scooters, bicycles, mopeds, etc.) are becoming more common modes of transportation for short trips in urban environments. These light electric vehicles are frequently designed to allow support a certain number of riders, and terms of riding may require that only an allowed number of riders are on a vehicle. However, riders sometime ride with more than the allowed number of people. This raises safety and regulatory concerns in jurisdictions that require only a certain number of riders.

SUMMARY

All vehicles have a maximum occupancy requirement, and light electric vehicles are no different. For example, electric scooters typically support a single rider. Multiple riders increase the risk of brake-downs, injuries, and accidents. There is currently no way to automatically detect whether the number of riders exceeds the allowed number. Therefore, there is a need for detecting and preventing multiple riders from using a light electric vehicle or other vehicles.

This disclosure includes systems and methods for detecting multiple riders, or more riders than a vehicle allows. These systems and methods can collect signals from multiple sensors on the vehicle and use those signals to determine whether there are more than one rider on the vehicle. These signals can be collected at one time period or over multiple time periods and compared. These signals can include data collected from, for example, one or more of an accelerometer, a gyroscope, a camera, a proximity sensor, and a pressure sensor. Additional signals can include the battery voltage, voltage delivered to the motor, current delivered to the motor, and vehicle speed. These signals may be measured directly via a sensor or correlated with an intended value when, for example, a controller is programmed to deliver a specific current to the motor. That specific current may be assumed to be accurately delivered or measured via another sensor. However, requiring another sensor may increase the cost of the light electric vehicle.

The data from these sensors may be processed using local or remote compute resources. Embodiments include different results from processing the data. The results may include one or more of providing various notifications of a violation, changed vehicle operation, additional charges for ride shares, banning of riders, etc.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Systems and methods of the present disclosure include light electric vehicles (e.g., scooters, bicycles, etc.) that may be coupled to a system comprising a network of backend servers and user computing devices. Each of these devices may be coupled to one another via various networks connected to the Internet.

Figure 1:
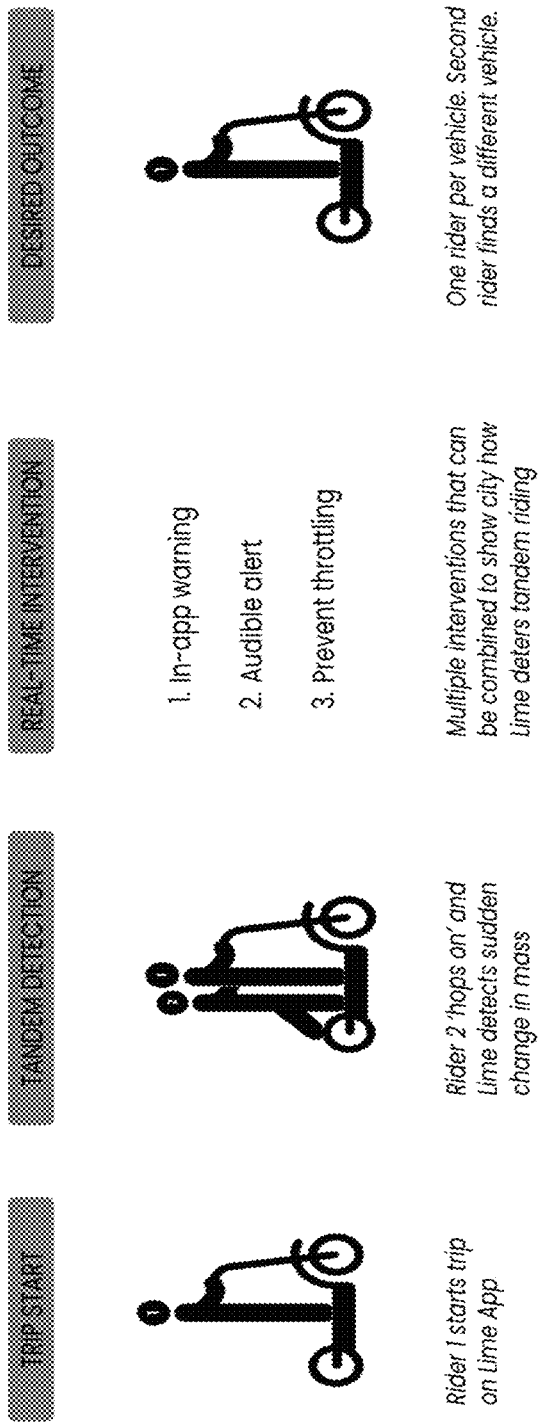
FIG. 1 illustrates an example of a flow for detecting a change in the number of riders on a vehicle according to one embodiment.

FIG. 1 illustrates example scenarios in which one or more riders are on a light electric vehicle. In the leftmost example, a single rider starts a trip on an application on their personal device, such as a smartphone. The disclosed systems and methods may detect a second rider who boards the vehicle, which detects a tandem ride by a sudden change in the mass of the rider(s) on the vehicle. The systems and methods may then make a real-time intervention, such as providing an in-app warning to the user on their personal device, generating an audible alert(s), prevent throttling, flashing lights, stopping the vehicle, or some combination of one or more of these interventions.

Some embodiments may use multiple escalating interventions. The first intervention may be an in-app warning. If, after a predetermined period of time, e.g., 1 minute, the second rider remains, a flashing light may turn on. If, after a second predetermined period of time, the second rider remains, an audible alarm may sound. Further interventions can include reducing speed to slow the vehicle or decreasing the vehicle's maximum speed. These interventions can continue until the second rider disembarks from the vehicle the vehicle is locked so that it will no longer move.

Figure 2:
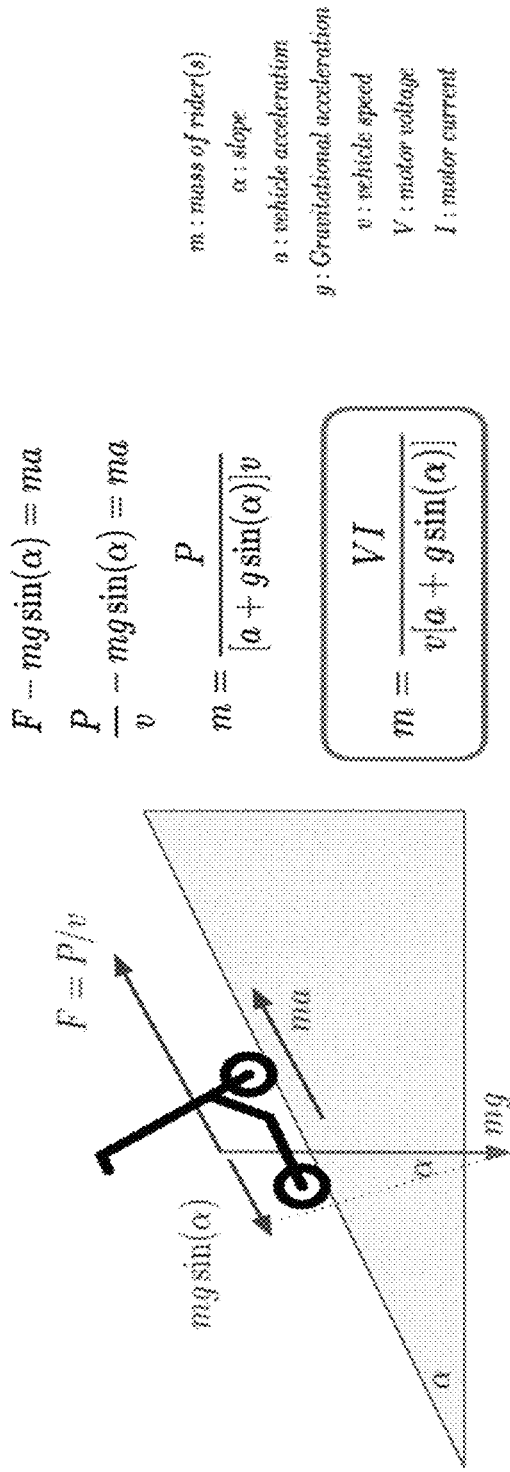
FIG. 2 illustrates a method for using data collected to calculate the mass of rider(s) according to one embodiment.

FIG. 2 illustrates an example of data that could be used to determine the number of riders on a vehicle based on an inference of the rider(s) weight, based on the following parameters: (m) mass of rider(s) and vehicle, (a) slope derived from a gyroscope signal, (a) vehicle acceleration or deceleration derived from an accelerometer signal corresponding to a vehicle's acceleration, (g) gravitational acceleration; (v) vehicle speed, (V) motor voltage derived from a motor-voltage signal of a voltage meter, and (I) motor current derived from a motor-current signal of a current meter. Note that Power (P) equals V×I.

$$m = \frac{VI}{v[a + g\sin(\alpha)]}$$

Other embodiments may include additional parameters, such as, (r) wheel radius, ($C_d$) wind resistance coefficient (e.g., ~0.209-0.346 for a bicycle), (f) rolling resistance, ($i_g$) reduction ratio, (A) frontal area, (δ) rotating mass conversion factor, ($\eta_t$) transmission efficiency ($\eta_{mg}$) motor efficiency, ($P_{acc}$) other power consumption (e.g., CCU, light, display), ($P_{loss}$) battery management system consumption. Using these additional factors may be used to get a more accurate value for the estimated mass of the riders and vehicles.

The systems and methods may periodically collect data from the accelerometer or gyroscope, for example, every second or every 200 ms. The system may collect data more frequently when tandem riding is detected, or less frequently when tandem riding is not detected. The frequency of data collection may optionally be configured by a remote server. In some embodiments, the data may be processed locally. In other embodiments, the data may be processed remotely at the remote server.

Alternatively, a pressure sensor input could be used to detect the mass of the rider(s). This would simplify the calculation because the mass could be measured directly rather than calculated from other variables. However, adding a pressure sensor would increase the complexity of the vehicle, possibly requiring multiple pressure sensors, which would increase the cost of the device.

In some embodiments, the server may determine that there are more than the allowed number of riders on a vehicle using data collected from the sensors, delivered to the processor, and transmitted to the server via a network interface, e.g., a wireless radio such as LTE. Processing the data at the server would have the benefit of allowing the server to know sooner whether there are more than the allowed number of riders on the scooter, but might overwhelm the server with data from all of the monitored vehicles. Alternatively, the sensor data could be processed locally by a processor attached to the vehicle, this would have the added benefit of offloading the server and may allow for more frequent sampling and longer battery life because less data would need to be transmitted to the server.

Figure 3:
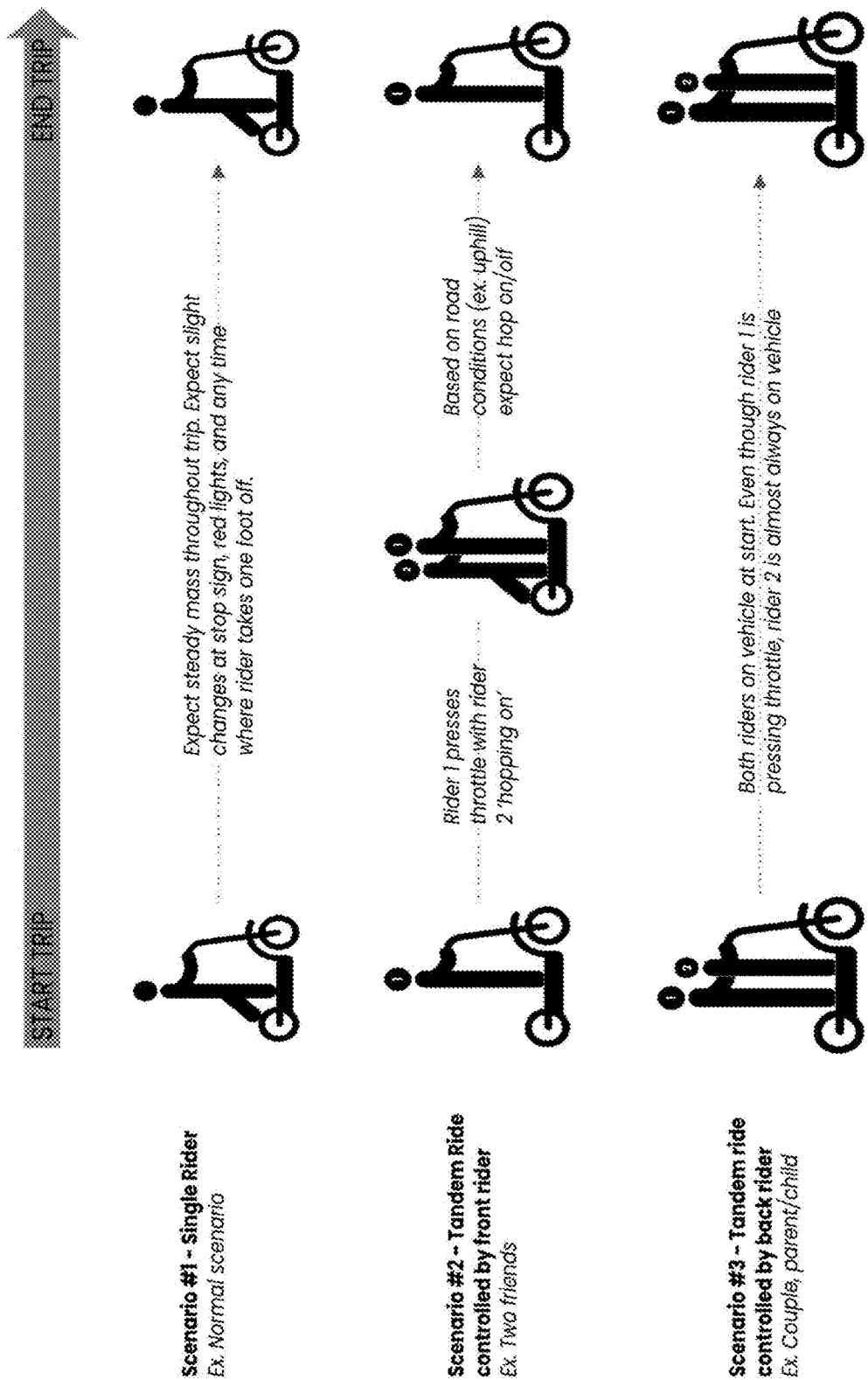
FIG. 3 illustrates different scenarios in which multiple riders may mount a light electric vehicle according to different embodiments.

FIG. 3 illustrates different scenarios in which multiple riders may be detected. In scenario 1, a single rider is detected as being on the vehicle at every sample. The single rider may place some of their weight on the ground when not moving, and the systems and methods will not assume that these changes are due to another rider mounting the vehicle. Scenario 2 is one in which a second rider mounts the vehicle in the middle of a ride. The weight of the rider(s) will change as a function of the second rider mounting the vehicle. Additionally, the system and methods may detect that the second rider dismounts the vehicle when going uphill because the mass may be too great for the vehicle to go uphill. Scenario 3 happens when two riders are on the vehicle from the beginning. The system can detect the second rider because the mass of the riders is greater than a predetermined value, such as 100 kg or 155 kg. The system may adjust this predetermined value based on prior measurements of the specific rider. The predetermined value may also be based on an initial weight of the rider, because typically a single rider will board a vehicle and a weight measurement can be made. If that weight measurement increases, then the vehicle can assume that there are two or more riders.

Figure 4:
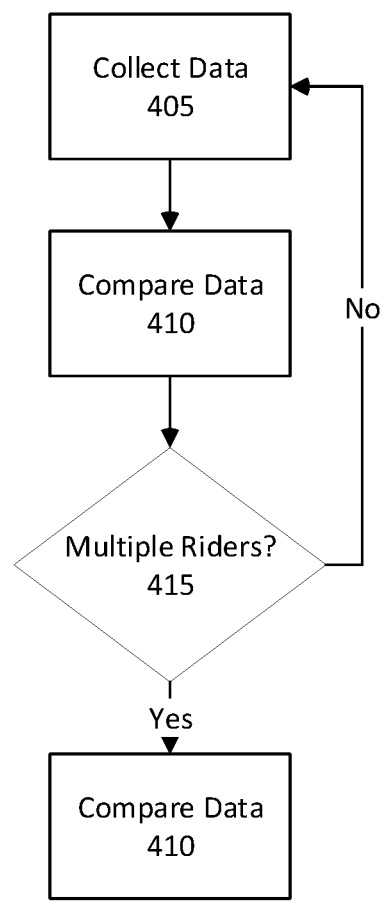
FIG. 4 illustrates a flow diagram of one embodiment of the present disclosure

FIG. 4 illustrates a flow diagram 400 according to one embodiment. In step 405, the system can acquire data from various sensors, such as a speedometer, accelerometer, gyroscope, wind sensor, etc. In step 410, the system can compare the current data set to a previous data set, if one exists, to create an output corresponding to the weight of the current rider(s). In step 415, a previous output is compared to a current output to determine whether there has been a change in the weight of the rider(s). If the change in weight exceeds a predetermined threshold, then the process proceeds to step 420. Step 420 can include a series of escalating behaviors until the system detects that there is only a single rider. This process can iterate several times with a series of escalating behaviors, such as sending a notification to a user's smartphone, making an audible noise, slowing the vehicle, or stopping the vehicle. The vehicle may restart operation after receiving a message from the user's smartphone acknowledging that there is a single rider.

Figure 5:
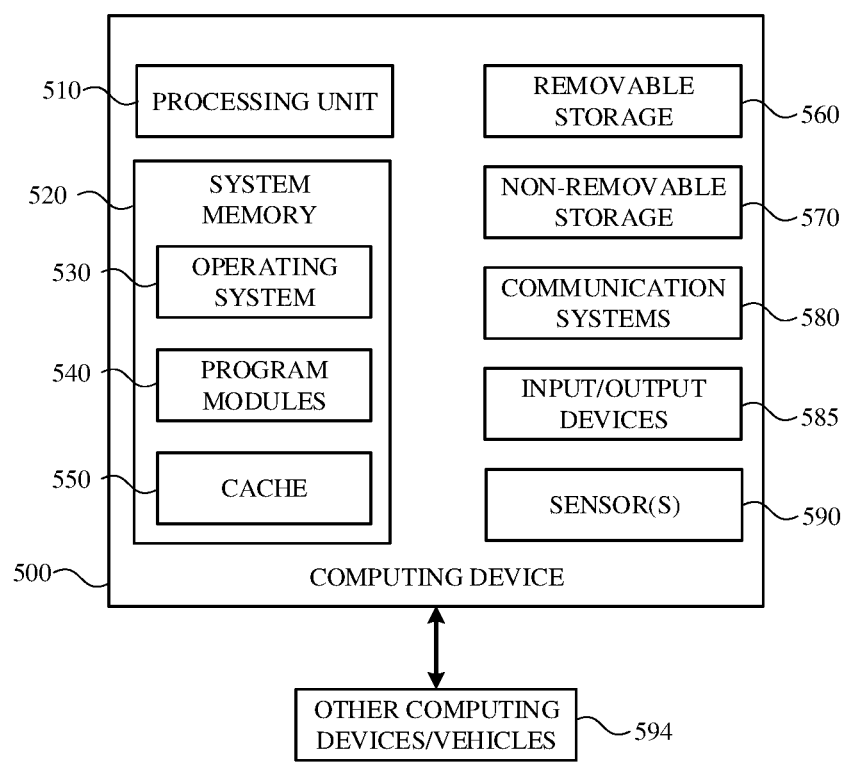
FIG. 5 illustrates a system diagram of a computing device that may be integrated or otherwise associated detecting multiple riders on a light electric vehicle.

FIG. 5 illustrates a system diagram of a computing device that may be integrated or otherwise associated with detecting multiple riders of a light electric vehicle. The computing device 500 may be integrated with or associated with a light electric vehicle and/or the head unit of a light electric vehicle described herein. As shown in FIG. 5, the physical components (e.g., hardware) of the computing are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering or determining expected force readings, light electric vehicle information, and the like. The system memory 520 may also store and/or provide cache 550 to store data from the sensors, as described herein. A number of different program modules and data files may be stored in the system memory 520, including operating state information. While executing on the at least one processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 500 may include one or more communication systems 580 that enable the electric vehicle to communicate with rechargeable batteries, other computing devices 595, a network service and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 585. These input/output devices 585 may include a keyboard, buttons, switches, a sound or voice input device, haptic devices, a touch, force and/or swipe input device, a display, speakers, etc. The aforementioned devices are examples and others may be used.

The computing device 500 may also include one or more sensors 590. The sensors may be used to detect or otherwise provide information about the operating condition of the computing device 500. In other examples, the sensors 590 may provide information about a light electric vehicle and/or whether the light electric vehicle brake inspection device is operating correctly and/or is being used correctly via Diagnostics Trouble Code DTCs (e.g., sensors sending signals to the CAN-bus indicating whether the handlebar and brake lever are correctly/completely inserted into the light electric vehicle brake inspection device). As discussed previously, the sensors can include GPS, speedometer, gyroscope, accelerometer, or pressure sensors for grips or seat. Each of the sensors has a corresponding signal that is output coupled to the microprocessor. For example, the accelerometer generates an accelerometer signal that may be output to the processor via the accelerometer output. Similarly, the gyroscope generates a gyroscope signal that may be output to the processor via the gyroscope output.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by non-transitory computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

We claim:

1. A method, comprising:
   a) receiving, at a processor from one or more sensors, one or more inputs indicative of a number of riders on a vehicle;
   b) determining, by the processor, whether the one or more inputs correspond to more than an allowed number of riders;
   c) generating, by the processor, a first output to a user indicating that there are more than the allowed number of riders on the vehicle;
   d) after generating the first output and waiting a first predetermined period of time, determining, by the processor, whether the one or more inputs correspond to more than an allowed number of riders;
   e) generating, by the processor, a second output to a user indicating that there are more than the allowed number of riders on the vehicle, wherein the second output is different from the first output;
   f) after generating the second output and waiting a second predetermined period of time, determining, by the processor, whether the one or more inputs correspond to more than an allowed number of riders;
   g) generating, by the processor, a signal to prevent throttling of the vehicle in response to determining that more than the allowed number of riders are on the vehicle and after generating the first output and the second output, wherein the steps are performed in order and the method returns to step b) in response to determining that the one or more inputs correspond to one rider on the vehicle.

2. The method of claim 1, wherein one of the one or more inputs include a pressure sensor input corresponding to a mass of one or more riders on the vehicle.

3. The method of claim 1, wherein one of the one or more inputs include an accelerometer signal corresponding to acceleration or deceleration of the vehicle.

4. The method of claim 3, wherein one of the one or more inputs include a gyroscope signal corresponding to slope of the vehicle.

5. The method of claim 4, wherein the one or more inputs include a motor-voltage signal and a motor-current signal.

6. The method of claim 5, wherein the determining step further comprises processing the accelerometer signal, the gyroscope signal, the motor-voltage signal, and the motor-current signal to determine a mass of one or more riders on the vehicle.

7. The method of claim 6, further comprising:
   comparing, by the processor, the mass of the one or more riders to a predetermined value, wherein the generating step is performed when the mass of the one or more riders is greater than the predetermined value;
   receiving, at a server from the processor, a message indicating detecting that the mass is greater than the predetermined value; and
   transmitting, by the server to a device corresponding to the user, a message indicating that there are more than the allowed number of riders on the vehicle.

8. The method of claim 7, wherein the output comprises an instruction to generate an audible alarm indicating that there are more than the allowed number of riders on the vehicle.

9. The method of claim 7, wherein the output comprises an instruction to modify a voltage, a current, or a combination of the two, provided to a motor of the vehicle.

10. The method according to claim 1, wherein the vehicle unlocks after receiving a message from the rider's smartphone acknowledging that there is a single rider.

11. A system comprising:
    a processor;
    an accelerometer comprising an accelerometer output coupled to the processor;
    a gyroscope comprising a gyroscope output coupled to the processor;
    the processor configured to:
      receive, from the accelerometer output and gyroscope output, one or more inputs indicative of a number of riders on a vehicle;
      determine whether the one or more inputs correspond to more than an allowed number of riders;
      generate a first output to a user indicating that there are more than the allowed number of riders on the vehicle;
      generate a second output to a user indicating that there are more than the allowed number of riders on the vehicle, wherein the second output is different from the first output;

after generating the second output and waiting a second predetermined period of time, determine whether the one or more inputs correspond to more than an allowed number of riders; and generate a signal to prevent throttling of the vehicle in response to a determination that more than the allowed number of riders are on the vehicle and after generation of the first output and the second output.

12. The system of claim 11, further comprising a voltage meter to output a motor voltage signal or a current meter to output a motor-current signal.

13. The system of claim 12, wherein the processor is further configured to process the accelerometer output, the gyroscope output, and a motor-voltage output or a motor-current to determine a mass of one or more riders on the vehicle.

14. The system of claim 13, wherein the processor is further configured to:
compare the mass of the one or more riders to a predetermined value, wherein the generating step is performed when the mass of the one or more riders is greater than the predetermined value;
receive, at a server from the processor, a message indicating detecting that the mass is greater than the predetermined value; and
transmit, by the server to a device corresponding to the user, a message indicating that there are more than the allowed number of riders on the vehicle.

15. The system of claim 14, wherein the output to the user comprises an instruction to generate an audible alarm indicating that there are more than the allowed number of riders on the vehicle.

16. The system of claim 11, wherein the instruction to determine whether the one or more inputs correspond to more than an allowed number of riders further includes considering a wind resistance coefficient.

17. An electric vehicle comprising:
a processor coupled to a memory;
an accelerometer coupled to the processor; and
a gyroscope coupled to the processor;
the processor further configured to perform instructions stored in the memory, the instructions configured to:
read a first sample of accelerometer data at a first time;
read a first sample of gyroscope data at the first time;
read a second sample of accelerometer data at a second time;
read a second sample of gyroscope data at the second time;
compare the first sample of the accelerometer data to the second sample of the accelerometer data;
compare the first sample of the gyroscope data to the second sample of the gyroscope data; determine that the light electric vehicle has less acceleration at the second time due to an increase in weight;
generate a second output to a user indicating that there are more than the allowed number of riders on the vehicle, wherein the second output is different from the first output;
after generating the second output and waiting a second predetermined period of time, determine whether the one or more inputs correspond to more than an allowed number of riders; and
generate a signal to prevent throttling of the vehicle in response to a determination that more than the allowed number of riders are on the vehicle and after generation of a first output and the second output.

18. The electric vehicle of claim 17, further comprising a voltage meter to output a motor-voltage signal or a current meter to output a motor-current signal.

19. The electric vehicle of claim 17, wherein the processor is further configured to process the accelerometer data, the gyroscope data, and a motor-voltage data or a motor-current data to determine a mass of one or more riders on the light electric vehicle.

20. The electric vehicle of claim 17, wherein the processor is further configured to:
compare a mass of one or more riders to a predetermined value, wherein the generating step is performed when the mass of the one or more riders is greater than the predetermined value;
receive, at a server from the processor, a message indicating detecting that the mass is greater than the predetermined value; and
transmit, by the server to a device corresponding to the user, a message indicating that there are more than the allowed number of riders on the light electric vehicle.

21. The electric vehicle of claim 20, wherein the output to the user comprises an instruction to generate one or more of a notification to a user device, an audible alarm, an instruction to slow the light electric vehicle, and an instruction to stop the electric vehicle, indicating that there are more than the allowed number of riders on the electric vehicle.

* * * * *